April 17, 1934.  A. A. FREY  1,955,328
METHOD OF PURIFYING HYDROGEN
Filed Jan. 6, 1931
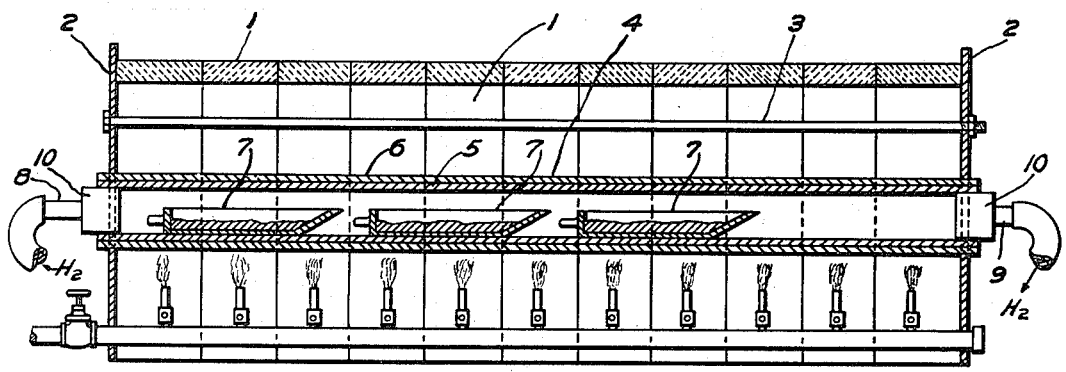
INVENTOR
*Albert A. Frey*
BY
ATTORNEY Patented Apr. 17, 1934

1,955,328

UNITED STATES PATENT OFFICE 1,955,328

METHOD OF PURIFYING HYDROGEN

Albert A. Frey, Forest Hills, Pa., assignor to Westinghouse Electric & Manufacturing Company, a corporation of Pennsylvania Application January 6, 1931, Serial No. 506,968

7 Claims. (Cl. 23—210)

My invention relates to methods of purifying hydrogen and more particularly to methods of removing such impurities as moisture, oxygen, nitrogen, carbon compounds and gases containing sulphur.

The principal object of my invention is to provide a method of purifying hydrogen which comprises passing commercial hydrogen gas over heated metallic magnesium or a suitable alloy containing magnesium.

Another object of my invention is to purify commercial hydrogen gas by a method which comprises passing commercial hydrogen gas over metallic magnesium, or a suitable magnesium alloy, which is maintained at a sufficient temperature to cause a reaction between the metal and the impurities in the gas.

It is the present commercial practice to produce hydrogen by the electrolysis of a saturated aqueous solution of potassium or sodium hydroxide. In this process, water vapor, oxygen, nitrogen and carbon dioxide and, sometimes, hydrocarbons and sulphur-bearing gases are introduced as impurities in the hydrogen, the amounts depending largely upon the skill employed in controlling the process. In certain metallurgical operations, such as annealing, hydrogen is employed as the annealing atmosphere, and, in some cases, it is essential that the hydrogen shall be free from the objectionable gases mentioned above in order that the annealed metal shall possess the most desirable physical and electrical properties.

It has heretofore been the practice to purify commercial hydrogen obtained in the manner specified, by successively passing it through heated nickel turnings, silica gel, calcium chloride and phosphorus pentoxide. This treatment partially dehydrated and deoxidized the hydrogen but it failed to remove carbon monoxide, carbon dioxide or nitrogen and it is questionable whether any of the halogen gases were removed. By this method, it was also impossible to accurately determine the saturation point of the silica gel and the termination of its capacity to absorb further gases. Furthermore, the method was complex and costly, as four absorbents were required and four operations were necessary.

I have made the discovery that commercial hydrogen may be purified by a method which comprises passing the hydrogen over metallic magnesium or a suitable magnesium alloy while maintaining the metal or alloy at an elevated temperature.

My invention will be better understood by reference to the accompanying drawing in which the single figure is a side elevational view, partly in cross-section, of a furnace which may be employed in my process.

Referring to the drawing, the numeral 1 designates the brick framework of the combustion furnace. Metallic plates 2 are positioned at each end of the framework and are fastened together by suitable stay rods 3 which serve to hold the bricks in compact relationship. Suitable apertures or openings are provided in the central portion of the plates 2 through which a combustion tube 4, is inserted. The combustion tube is supported by the plates and is preferably composed of an inner tube 5 and an outer tube 6. The inner tube is preferably composed of a metal, such as iron or steel, which will not react with the magnesium, while the outer tube is composed of a metal, such as nickel, stainless steel or a suitable nickel or chromium alloy, which is resistant to oxidation. Metallic magnesium, a magnesium alloy or a mixture of two or more of such substances, preferably in granular, lump or stick form, is first placed in combustion boats 7 which are inserted in the combustion tube 4, or the powdered magnesium or magnesium-bearing substance may be evenly distributed on the inner surface of the tube 5. Iron or steel adaptor plugs 10 provided with an inlet pipe 8 and an outlet pipe 9, are screwed into the ends of the combustion tube 4, thereby providing an air-tight seal between the adapter and the combustion tube. The assembled combustion tube is then inserted through the apertures in the plate 2 and is heated by any suitable means, as by gas or electrical energy.

The commercial hydrogen is introduced into the combustion tube through an inlet pipe 8 and is passed through the tube at a predetermined rate of flow from whence it may be conducted to an annealing furnace or it may be compressed for future use. As previously specified, either gas or electrical energy may be utilized to heat the reaction tube. When gas is utilized as the heating means, the burners may be so regulated that a temperature gradient, varying between the maximum and minimum temperatures desired, may be obtained. For example, at the ends of the tube, it is desirable that the temperature should be approximately normal to prevent the gases from being heated to such an extent that they will attack the connecting tubes which are preferably composed of rubber.

It is also desirable that the exit end of the tube should be maintained at a low temperature so that none of the vapors of the magnesium will pass off with the purified hydrogen. It is desirable, however, that the temperature of the intermediate portion of the tube should, in general, be maintained at a temperature of at least 600° to 700° C. in order to effect a reaction between the magnesium and such impurities as the halogens, the sulphur-bearing gases, the hydrocarbon and the oxides of carbon that may be present. If electrical energy is utilized to heat the tubular furnace, a gradient of temperatures may be obtained by connecting a number of electrically heated reaction tubes in series and heating each tube to the desired temperature, or I may utilize a single tube, such as the one I have illustrated, and supply a greater amount of electrical energy to the end portions of the tubes than to the intermediate portion, in the same manner as when gas is utilized.

I have found that about .5 gram to 1.5 grams of magnesium to each cubic foot of commerical hydrogen are sufficient to purify a gas containing 95% to 97% hydrogen when the hydrogen is passed through the tube at the rate of approximately 100 liters per minute. The amount of magnesium which is placed in the tube will, of course, depend upon the capacity of the tube, the quantity of commercial hydrogen that is to be purified, and the rate at which it is to be purified. It is desirable, of course, to have an excess of the magnesium present in order to provide the usual factor of safety.

The temperature at which the magnesium is maintained in the intermediate portion of the tube 4, while the commercial hydrogen gas is passing through the reaction tube, will vary from slightly above 100° C., which is the temperature at which the magnesium will react with moisture, to 1120° C. which is the boiling point of magnesium under atmospheric pressure, although it will be understood that, if the pressure in the tube exceeds atmospheric, the temperature may be correspondingly raised, but should never exceed the boiling point of magnesium. The particular temperatures and pressures maintained in the tube will, of course, depend largely upon the design and modification of the apparatus which is employed and the results desired.

For example, the moisture in the hydrogen will react with the magnesium at a temperature slightly above 100° C., while temperatures of 600° C. and 670° C. are required to effect reactions between the magnesium and the oxygen and the nitrogen, respectively. Higher temperatures are required to remove the other impurities. For example, a temperature corresponding to approximately red heat is required to remove the sulphur-bearing gases and the halogens, while a temperature corresponding approximately to the boiling point of the magnesium may be required to remove such impurities as the oxides of carbon and certain hydrocarbons. It may be stated that the principal impurities that are detrimental in annealing processes may be removed at a temperature of approximately 700° C., although, if a higher degree of purity is desired, it is necessary to heat a portion of the tube to approximately the vaporization point of the magnesium. In the event that some of the magnesium should vaporize at this temperature, it will condense as it is drawn into the cooler portion of the tube.

At the temperatures specified in the foregoing paragraph, magnesium will react with the moisture, the hydrogen sulphide and the hydrocarbons, forming oxide, sulphide and carbide compounds of magnesium, respectively, and hydrogen. The nitrogen and halogens react synthetically with the magnesium to form nitrides and halides. The magnesium also reacts with the oxygen, and the oxides of carbon and sulphur to form magnesium oxide, magnesium sulphide and carbon.

Heated metallic magnesium will also react with many other gases and compounds to form magnesium compounds which are stable and exist as the solid phase at the various combustion temperatures which I have previously mentioned.

Under certain conditions, the magnesium may be utilized in the powdered form, in which case, the velocity of the reactions between the gases and the metallic magnesium will be increased. Powdered magnesium is especially desirable if the temperature employed is below the melting point of magnesium.

While I preferably employ metallic magnesium as the purifying agent, satisfactory results have been obtained when compounds of magnesium with aluminum and calcium, or alloys of magnesium with other metals, such as aluminum, calcium, nickel or copper, are utilized.

My process is especially useful for purifying commercial hydrogen containing approximately 95% to 97% pure hydrogen, the remainder being water vapor, oxygen, nitrogen, carbon monoxide, carbon dioxide and sulphur-bearing gases. It will, of course, be understood that my process will not remove elements which do not react with magnesium, such as argon, xenon and krypton, but such gases are practically inert and do not deleteriously affect the use of the hydrogen for commercial purposes.

By my improved method, magnesium, which is an inexpensive and readily available material, is utilized to effectively purify hydrogen. In previous practice, at least four different operations and four different absorbents were required, whereas, by my improved method, hydrogen gas may be purified in one operation. Furthermore, by my improved method, I am able to readily determine the point when the reactive capacity of the magnesium is exhausted because magnesium reacts in definite chemical proportions. It is, therefore, superior to the absorbents previously utilized, in which the impure gases were held by mechanical absorption and not by chemical combination, because such absorption agents become very ineffective as their saturation points are approached and difficulty is encountered in determining when such a point is reached. For instance, in the absorption of moisture by silica gel, the point at which it ceases to function can be accurately determined only with great difficulty.

While I have disclosed my invention in considerable detail and have given specific examples, it will be understood that the examples should be construed as illustrative and not by way of limitation, and, in view of the numerous modifications which may be effected therein without departing from the spirit and scope of my invention, it is desired that only such limitations shall be imposed as are indicated in the appended claims.

I claim as my invention:

1. A method of assuring the purity of hydrogen by removal of any moisture, oxygen, nitrogen, carbonaceous or sulphurous gases which comprises passing the gas over a heated metal comprising magnesium.

2. A method of assuring the purity of hydrogen by removal of any moisture, oxygen, nitrogen, carbonaceous or sulphurous gases which comprises passing the gas over metalic magnesium maintained at an elevated temperature.

3. A method of assuring the purity of hydrogen by removal of any moisture, oxygen, nitrogen, carbonaceous or sulphurous gases which comprises passing the gas into contact with finely divided magnesium which is maintained at an elevated temperature, the impurities present in the hydrogen reacting with the finely divided magnesium and being thereby removed.

4. A method of assuring the purity of hydrogen by removal of any moisture, oxygen, nitrogen, carbonaceous or sulphurous gases which comprises passing the gas over an alloy containing magnesium which is maintained at an elevated temperature.

5. A method of assuring the purity of hydrogen by removal of any moisture, oxygen, nitrogen, carbonaceous or sulphurous gases which comprises passing the gas over granular magnesium which is maintained at temperatures varying between 100° C. and 1120° C.

6. The method of assuring the purity of hydrogen by removal of any moisture, oxygen, nitrogen, carbonaceous or sulphurous gases which comprises passing the hydrogen over a substance containing magnesium at a temperature of at least 700° C.

7. The method of assuring the purity of hydrogen by removal of any moisture, oxygen, nitrogen, carbonaceous or sulphurous gases which comprises placing magnesium in a combustion tube, maintaining the magnesium at an elevated temperature, and passing hydrogen over the heated magnesium, the temperature of magnesium being greater at the intermediate portions of the tube than at its extremities.

ALBERT A. FREY.